United States Patent
Hartwig

(10) Patent No.: US 9,297,516 B2
(45) Date of Patent: Mar. 29, 2016

(54) PHOSPHOR WHEEL FOR CONVERTING PUMP LIGHT

(71) Applicant: Ulrich Hartwig, Berlin (DE)

(72) Inventor: Ulrich Hartwig, Berlin (DE)

(73) Assignee: OSRAM GmbH, Munich (DE)

( * ) Notice: Subject to any disclaimer, the term of this patent is extended or adjusted under 35 U.S.C. 154(b) by 0 days.

(21) Appl. No.: 13/909,731

(22) Filed: Jun. 4, 2013

(65) Prior Publication Data

US 2014/0022760 A1   Jan. 23, 2014

(30) Foreign Application Priority Data

Jun. 4, 2012 (DE) .......................... 10 2012 209 426

(51) Int. Cl.

| | |
|---|---|
| *F21V 9/16* | (2006.01) |
| *F21V 9/08* | (2006.01) |
| *G02B 26/00* | (2006.01) |
| *G03B 21/20* | (2006.01) |
| *G03B 33/08* | (2006.01) |

(52) U.S. Cl.
CPC ................ *F21V 9/08* (2013.01); *G02B 26/008* (2013.01); *G03B 21/204* (2013.01); *G03B 33/08* (2013.01); *G02B 26/007* (2013.01)

(58) Field of Classification Search
CPC .......... F21V 9/08; F21V 14/08; G02B 26/007; G02B 26/008; F21S 10/007
See application file for complete search history.

(56) References Cited

U.S. PATENT DOCUMENTS

| | | | |
|---|---|---|---|
| 7,651,243 B2* | 1/2010 | McGuire et al. ............... 362/293 |
| 2007/0019408 A1 | 1/2007 | McGuire, Jr. et al. |
| 2011/0116253 A1* | 5/2011 | Sugiyama ........................ 362/84 |
| 2012/0062857 A1 | 3/2012 | Saitou et al. |
| 2012/0201030 A1* | 8/2012 | Yuan et al. ..................... 362/293 |
| 2013/0033651 A1* | 2/2013 | Haraguchi et al. ............ 348/744 |
| 2013/0107221 A1* | 5/2013 | Hsu et al. ....................... 362/231 |
| 2014/0204558 A1* | 7/2014 | Bartlett ............................ 362/84 |

FOREIGN PATENT DOCUMENTS

JP          2011154168 A  *  8/2011

* cited by examiner

*Primary Examiner* — Mariceli Santiago

(74) *Attorney, Agent, or Firm* — Cozen O'Connor

(57) ABSTRACT

A phosphor wheel for converting pump light to conversion light, on which a first phosphor for emitting conversion light of a first color and a second phosphor for emitting conversion light of a second color are provided. The light of first and second phosphors, which are arranged in a manner spatially separated from one another on the phosphor wheel, has the same hue in this case. Depending on the requirement, either the first or the second phosphor can thus be selected.

12 Claims, 6 Drawing Sheets

| Type | Color (emission) | Chemical notation | Observations |
|---|---|---|---|
| Garnet | green-yellow | Lu-Al-Ga-garnet | High stability, high efficiency, poor color locus (yellowish green) |
| Garnet | green-yellow | Lu-Al-garnet | High stability, high efficiency, poor color locus (yellowish green) |
| Garnet | green-yellow | Y-Al-garnet | High stability, high efficiency, poor color locus (yellowish green) |
| Chlorosilicate | green | $Ca_8Mg(SiO_4)_4Cl_2:Eu^{2+}$ | Low stability, low efficiency, good color locus in the green |
| SiON | green | $SrSi_2O_2N_2:Eu^{2+}$ | Low stability, very high efficiency, mediocre color locus in the green |
| Lu, N-doped silicate | green | $(Sr,Ba,Lu)_2Si(O,N)_4:Eu^{2+}$ | Low stability, low efficiency, good color locus in the green |

Table 1

Fig. 6

PHOSPHOR WHEEL FOR CONVERTING PUMP LIGHT

RELATED APPLICATIONS

This application claims the priority of German Application No. 10 2012 209 426.1 filed Jun. 4, 2012, the entire content of which is hereby incorporated by reference.

FIELD OF THE INVENTION

The present invention relates to a phosphor wheel for converting pump light to conversion light.

BACKGROUND OF THE INVENTION

The use of phosphors for converting more highly energetic pump light to useful light having a longer wavelength is already known from florescent lamps in which, for example, UV light generated in a mercury gas is converted to visible light by a phosphor. In this case, the phosphor is typically provided on an inner wall of the discharge vessel containing the mercury gas.

The most recent developments concern light sources having an improved energy efficiency, for example, and in this case likewise have recourse to the principle of converting originally more highly energetic pump light, which can be emitted for instance by an LED semiconductor component. Furthermore, arrangements are also known in which a light source having a high power density, for instance a laser, is combined with a phosphor arrangement which converts pump light and which is arranged in a manner spaced apart from the pump light source.

The present invention addresses the technical problem of specifying a phosphor arrangement which is advantageous relative to the prior art.

SUMMARY OF THE INVENTION

This problem is solved according to one aspect of the invention directed to a phosphor wheel for converting pump light to conversion light, which is designed for rotation about a rotation axis and on which a first phosphor for emitting conversion light of a first color and a second phosphor for emitting conversion light of a second color are provided, wherein first and second phosphors are arranged in a manner spatially separated from one another on the phosphor wheel, and the light of the second phosphor has the same hue as the light of the first phosphor.

The arrangement of the phosphor on a phosphor wheel can be advantageous because the rotation can make possible, for example, a particularly simple change between the phosphors, for instance if the entire wheel is not illuminated, rather only ever a part thereof is moved with the rotation through a pump light cone.

This is because on the phosphor wheel according to an embodiment of the invention provision is made not just of a first phosphor but additionally of a second phosphor, to be precise of the same hue, which can preferably be pumped with pump light of the same wavelength. "Phosphor" here means both a pure phosphor and a phosphor mixture of a plurality of pure phosphors; therefore, the first and the second phosphor can for example also be in each case such a mixture, wherein the two mixtures then differ in at least one pure phosphor. The phosphors are arranged in a manner spatially separated from one another on the phosphor wheel, that is to say in regions which differ at least partly, preferably completely, in relation to an area direction of the phosphor wheel and which particularly preferably laterally adjoin one another (an overlap is also conceivable, in principle, but not preferred).

From the standpoint of the CIE standard chromaticity system, "of the same hue" means that two straight lines drawn in each case from the white point to the color of the first and second phosphor, respectively, jointly span an angle which increasingly preferably in this order is less than 90°, 70°, 60°, 50°, 40°, 30°. The first and second phosphors are "colored", that is to say do not lie at the white point in the CIE standard chromaticity system, but rather are at a distance of increasingly preferably in this order 0.05, 0.1, 0.15, 0.2 from said white point in terms of absolute value. The color indications of the phosphors preferably relate to a pump light wavelength of increasingly preferably in this order at least 200 nm, 250 nm, 300 nm, 350 nm, 400 nm, 410 nm, 420 nm, 430 nm and (independently of this lower limit) at most 800 nm, 750 nm, 700 nm, 650 nm, 600 nm, 550 nm, 500 nm, 490 nm, 480 nm, 470 nm.

Therefore, by virtue of the fact that at least two phosphors of the same hue are provided according to the invention, one or the other can be used for conversion for example depending on the concrete requirement. Specifically, the inventor has ascertained that some phosphors have for example a high color saturation and/or a good color locus and can thus be advantageous with regard to color rendering, whereas other phosphors should be preferred on account of a higher efficiency and/or lifetime. With a phosphor wheel according to the invention, the suitable phosphor can now be selected in a situation-dependent manner, for example, such that the corresponding illumination unit (if necessary) has good color rendering properties and otherwise the use of a degradation-resistant phosphor can increase the lifetime or the use of a more efficient phosphor can reduce the energy consumption.

Insofar as a pump light source is mentioned in the context of this disclosure, this generally does not rule out the presence of one or more further pump light sources which can complement one another for example spectrally and/or in the time characteristic, that is to say can also illuminate the phosphor alternately.

For the realization of the features of the main claim, it is also not necessary for light propagation or pump light conversion to be effected, rather the phosphor wheel or the illumination unit is merely intended to be designed correspondingly. The same applies to the rotation of the phosphor wheel.

The term "phosphor wheel" is also not intended to imply that said wheel must necessarily have a circular-disk-shaped or annular geometry, but rather generally means a flat body which can have for example an at least 2-, 5-, 10-, 20-fold larger extent (in the case of a non-circular geometry, related to the average value of shortest and longest extents) in an area direction than perpendicular thereto. The flat body can generally also be curved and have, for instance, the form of a funnel or a shell; however, the body is preferably a planar body designed for rotation about a rotation axis extending transversely with respect to the area, preferably perpendicularly thereto.

The phosphor wheel is constructed for example from a substrate different than the phosphor, for instance from metal or a plastics material, to which the phosphors are applied, for instance by dispensing, bursting, blade coating, spreading or spraying of a phosphor suspension. On account of the suitability for rotation, the substrate is preferably nevertheless circular-disk-shaped and a rotation shaft is connected to the substrate; the rotation shaft can also be connected to an annular substrate or penetrate through the latter.

Such a substrate is usually embodied as flat, that is to say has a larger extent in the area direction than perpendicular thereto, for instance at least 2-, 5-, 10-, 20-fold larger (in the case of a non-circular geometry, related to the average value of shortest and longest extents); the same applies to the phosphor layer provided on the substrate, with the result that the phosphor wheel overall is planar (apart, for example, from fixing means for a rotation shaft or the like).

The phosphor wheel can be operated in transmission and/or in reflection; operation in both transmission and reflection is conceivable, for example, if one phosphor is applied rather thickly (operation in reflection) and another is applied thinly by comparison (operation in transmission).

"Pump light" in the context of this disclosure firstly means electromagnetic radiation which can be emitted by a laser, for example, and which, with regard to its wavelength, is not restricted to the visible range, but rather can for example also lie in the ultraviolet or infrared; however, "pump light" is also intended to encompass corpuscular radiation, for instance electron or ion radiation. However, LED or laser radiation is preferred.

Further preferred configurations are specified in the dependent claims and the description hereinafter, wherein the individual features can also be essential to the invention in different combinations and the description implicitly always relates not only to the phosphor wheel but also to an illumination unit therewith, a method for operation and corresponding uses.

A first preferred configuration relates to a phosphor wheel wherein the color of the second phosphor is at a distance of less than 0.2, preferably less than 0.1, particularly preferably less than 0.05, in the x-direction from the color of the first phosphor in the CIE standard chromaticity system; independently of the distance in the x-direction, in a preferred configuration, the colors are at a distance of less than 0.2, preferably less than 0.1, particularly preferably less than 0.05, from one another in the y-direction as well.

The closer together the colors of first and second phosphors, the less conspicuous an alternative use of the two phosphors is for example to a user of a projection device. This may be of interest and advantageous if the first and second phosphors differ for instance to the effect that one should be preferred on account of its quantum efficiency and the other owing to its better degradation properties, but the two phosphors scarcely differ with regard to color.

With a phosphor wheel on which both phosphors are provided according to the invention, when each phosphor is illuminated in each case only proportionally over the operating duration, an illumination unit having firstly (on account of the good quantum efficiency) a reduced energy consumption and secondly a sufficient lifetime can nevertheless be realized. In this case, the arrangement of the two phosphors in a manner spatially separated from one another can for instance also have the advantage that, in the context of maintenance, a less degradation-resistant phosphor can be replaced independently of the other phosphor, for example also by a module that can be placed onto the phosphor wheel.

In a preferred configuration, the color of the second phosphor has a higher color saturation than the color of the first phosphor. The phosphor wheel can thus be used for example as an illumination unit of a projection device and one or the other phosphor can be operated depending on the requirement; for instance a first phosphor having a high luminous efficiency in daylight and/or when rendering text contents, and a second phosphor having a high color saturation in darkened conditions and/or when rendering image contents.

It goes without saying that in this case exclusively one or the other phosphor need not necessarily be operated, rather both phosphors can also proportionally provide conversion light. "Operating" a phosphor therefore means using it to generate conversion light which is also supplied for a further use at this point in time. In a preferred configuration, however, only the phosphor whose conversion light is actually intended to be used (apart from scattering effects) is actually illuminated with pump light.

In a further configuration, the color of the second phosphor and that of the first phosphor lie on a common straight line with the white point in the CIE standard chromaticity system, because on a corresponding straight line the color saturation increases with the hue remaining the same toward the spectrum locus/line of purples. In this case, points which, with respect to a common compensation straight line, are in each case at a distance which, in terms of absolute value, is not greater than 0.05, preferably not greater than 0.02 or 0.01, are also intended to be regarded as "lying on a common straight line".

A further preferred embodiment relates to a phosphor wheel comprising, alongside the first phosphor, two additional first phosphors, wherein the colors of the three first phosphors jointly span an RGB color space. Furthermore, the color of the second phosphor together with the colors of the two additional first phosphors also spans an RGB color space, wherein the color spaces spanned by first and second phosphors differ in terms of their area in the CIE standard chromaticity system by at least 5%, preferably at least 10%, particularly preferably at least 20%.

The areas of two triangles spanned in the CIE standard chromaticity system are therefore compared, the white point lying in each of said triangles. The triangle having a larger area can be for example the one having the second phosphor and can be better suited for instance to color rendering, that is to say for example representing image contents; the first (not additional) phosphor in the smaller triangle can in turn afford advantages with regard to its degradation properties.

Generally, the hue of the first and second phosphors lies preferably in the red and particularly preferably in the green. A supplementation in the green spectral range is particularly advantageous because, from among the currently known phosphors (to which the concept of the invention is nevertheless not restricted), those in the green spectral range are rather less efficient. Therefore, by way of example, a phosphor wheel having two red or preferably two green phosphors can be provided; on the other hand, the second phosphor can also supplement three first phosphors spanning an RGB color space in the manner described above, to be precise particularly preferably in the green.

On a phosphor wheel having three first phosphors, alongside the first (always supplemented) phosphor, one of the additional first phosphors can also be supplemented by an additional second phosphor, such that, therefore, five phosphors in three hues would be provided; a supplementation of all three first phosphors is also possible. Furthermore, it is also possible in general, that is to say independently of an RGB color space, to provide a plurality (at least two) of first phosphors, one or else, for example, all of which is/are supplemented by a second phosphor in each case. Within a hue as well, for example, a multiplicity (more than two) of phosphors can be provided; a phosphor wheel having a first and exactly one second phosphor (on which a plurality of first phosphors can also be provided, preferably three) is nevertheless preferred.

Generally, the invention is, of course, not restricted to an RGB color space; by way of example, it is also possible to supplement a color of a 2-component or 4-component color space (a 4-component color space can for example also be an RGB color space having a further color, for instance having yellow).

If an RGB color space is at issue, in the CIE standard chromaticity system "red" can preferably lie at an x-value of 0.64 and a y-value of 0.33; "green" is preferably found at an x-value of 0.30 and a y-value of 0.60, whereas "blue" is found at an x-value of 0.15 and a y-value of 0.06. However, this illustrates only one possible color space; in other words, deviations can also be possible in each case, for instance by, in terms of absolute value, increasingly preferably in this order at most 0.2, 0.1, 0.05.

The first and second phosphors can be arranged on the phosphor wheel for example successively in a radial direction, that is to say can be provided as rings nested in one another for instance on a corresponding substrate.

In a preferred configuration, in a phosphor wheel according to the invention, the first and second phosphors are arranged successively in a circumferential direction, preferably provided in this way on a substrate. The phosphors can therefore be arranged for example in circle sectors, or annulus sectors, which preferably adjoin one another, particularly preferably directly.

One advantage of such a phosphor wheel may consist, for example, in the fact that the phosphor to be operated in each case can be selected by means of the temporal control of the pump light source (or a corresponding shutter), to be precise for example also with an unchanged relative arrangement of the optical components (pump light source, phosphor wheel, mirrors, lenses, etc.). This can be advantageous for instance with regard to the design of a corresponding illumination unit, because it is not necessary to take account of two pump light paths.

Generally, the invention also relates, namely, to an illumination unit, that is to say an arrangement comprising phosphor wheel and pump light source (also a plurality of pump light sources), if appropriate supplemented by further optical components mentioned above.

A phosphor wheel having successive phosphors in a circumferential direction is therefore preferably operated in such a way that, relative to a complete rotation of the phosphor wheel by 360°, pump light is radiated in only for a proportion of the time duration required for the rotation. However, this concept of the invention is not restricted to a phosphor wheel having circumferentially successive phosphors and is also regarded as an invention independently of the features of the main claim and is intended to be disclosed in this form, that is to say for example also relates to a phosphor wheel having only one phosphor. Preferably, the illumination that is only proportional per revolution is effected by means of a corresponding control of the pump light source in this case for reasons of energy efficiency.

In a further configuration that is equally deemed to be an invention independently of the features of the main claim, the same phosphor is illuminated during two successive rotations of the phosphor wheel, but the regions of the phosphor which are illuminated per revolution differ at least partly in this case. Therefore, by way of example, an annulus segment of the phosphor wheel can be illuminated during the first revolution and an annulus segment offset by an angle with respect thereto can be illuminated during the subsequent revolution; the annulus segments can also partly overlap. One advantage of this mode of operation may consist, for instance, in the fact that if a respective region is not illuminated with pump light, it cools somewhat, which can be advantageous with regard to degradation.

Particularly preferably, a phosphor wheel having phosphors arranged successively in a circumferential direction is illuminated with pump light in an interrupted manner in such a way that exclusively the first or exclusively the second phosphor is illuminated during a complete revolution. Usually, in the case with a corresponding rotational speed of the phosphor wheel, the corresponding phosphor is exclusively illuminated by means of a multiplicity of revolutions, that is to say that the operated phosphor is changed in each case after a multiplicity of revolutions.

The above-described phosphor wheel or a corresponding illumination unit can be used for a projection device, an endoscope, room lighting purposes and generally industrial and/or medical applications.

The use for a projection device is particularly preferred, to be precise in conjunction with a situationally implemented selection of first or further phosphor. The selection can therefore be implemented for instance as described above on the basis of the rendered content (text contents or image rendering) and/or on the basis of the ambient light conditions. The latter can for example also be measured by means of a sensor, such that the selection is implemented in an automated manner.

Particularly preferably, a first phosphor exhibiting lower degradation/higher stability than the second phosphor is selected for rendering text contents, and the second phosphor, which emits light with a better color locus than the first phosphor, is selected for representing image contents. Generally, the term "stability" relates to the temporal constancy of the conversion properties of the phosphor, that is to say that the stability is high if the conversion efficiency decreases slightly at most over the course of time.

BRIEF DESCRIPTION OF THE DRAWINGS

The invention will be explained in greater detail below on the basis of exemplary embodiments. In the figures:

FIG. 6 shows Table 1 having examples of phosphors having a green hue.

PREFERRED EMBODIMENTS OF THE INVENTION

Figure 1A:
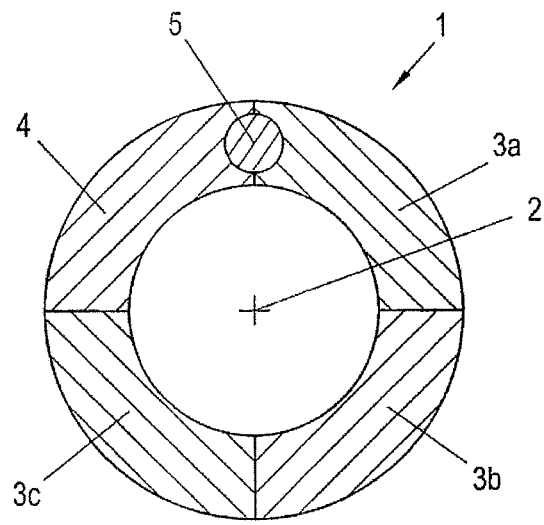
FIG. 1 shows a phosphor wheel having three first and one second phosphor.
Figure 1B:
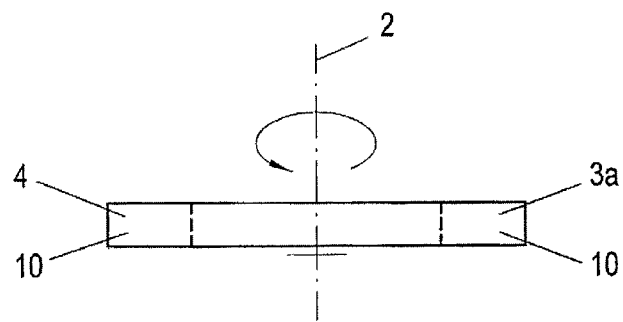

FIG. 1 shows a schematic illustration of a phosphor wheel 1, which rotates about a rotation axis 2. The phosphor is provided on a substrate 10 composed of metal, that is to say on a thin metal disk; a rotary shaft (not shown) is fixed to the metal disk, by means of which rotary shaft the phosphor wheel 1 can be caused to rotate.

The phosphor is arranged on the phosphor wheel 1 in an annular fashion, to be precise distributed on four annulus sectors (quadrants) each taking up 90°. In this case, a first green phosphor 3$a$ and a second green phosphor 4 are arranged in two adjacent quadrants and a further first phosphor 3$b$, $c$ is respectively arranged in the other two quadrants, namely a first phosphor 3b designed for emitting red light and a first phosphor 3c designed for emitting blue light.

By means of optical elements, pump light emitted by a laser is directed onto the phosphor wheel 1, such that a pump light cone 5 is incident thereon. With the rotation of the phosphor wheel 1, the different phosphors are then moved through the pump light cone 5, wherein the conversion light emitted by the individual phosphors is then selectively reflected into an image area by means of a micromirror array and an image content or text content is thus rendered by means of a projection device.

By means of a control of the laser, the pump light in this case is interrupted depending on the rotational speed such that either the first green phosphor 3a or the second green phosphor 4 is illuminated during a revolution of the phosphor wheel 1. The first phosphor 3a is distinguished by a high stability (cf. the observations regarding table 1) and is therefore selected if a particularly good color rendering is not of importance in the case of the contents rendered by the projection device.

By contrast, the second phosphor 4, which is distinguished by a good color locus in the green but has only a low stability, is only selected if image contents having high color saturation are intended to be rendered; the user can make the selection for example directly on the projection device. Overall, the lifetime of the projection device is thus increased, to be precise if necessary without losses in the color rendering.

As an alternative to the phosphor wheel 1 shown in FIG. 1, on which all phosphors spanning the RGB color space are provided, on a phosphor wheel 1 it is also possible to provide only the first and the second green phosphor 3a, 4 and the remaining colors can be made available for example by LED light sources. If the phosphor wheel 1 is then in turn pumped by a laser, a so-called hybrid system is present on account of the combination of laser and LED light sources. In the case of such a phosphor wheel having only two phosphors, each phosphor could take up half of the annulus, for example, and the selection of first or second green phosphor 3a, 4 could in turn be implemented by means of correspondingly interrupted pump light illumination.

Figure 2:
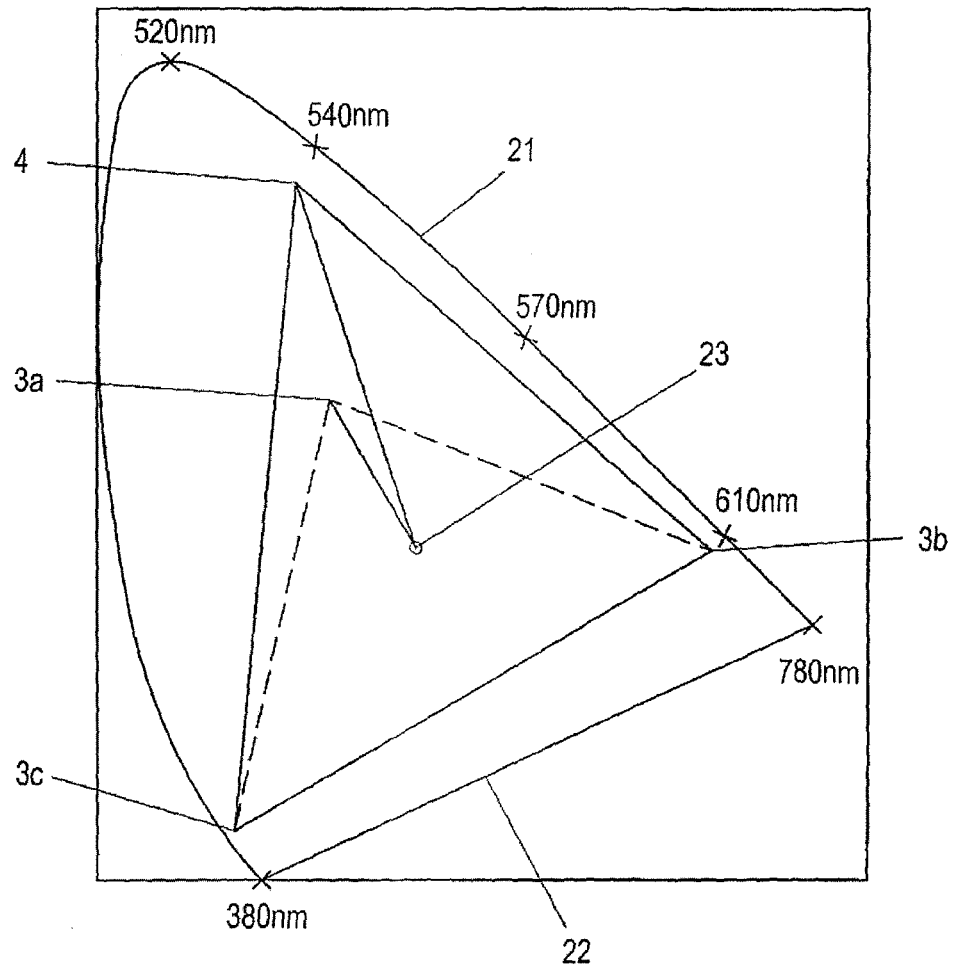
FIG. 2 shows two RGB color spaces in the CIE standard chromaticity system, to be precise with first and second green phosphors.

FIG. 2 shows the color locus of three first phosphors 3a, b, c and a second phosphor 4 plotted in a CIE standard chromaticity diagram. The so-called spectrum locus 21 together with the line of purples 22 encloses the totality of possible colors, wherein the color saturation in each case increases from the central white point 23 toward the spectrum locus 21 and line of purples 22. For rough orientation, the right corner of the horseshoe shape contains the red hues, the green hues are at the top, and the blue hues at the bottom left.

First and second green phosphors 3a, 4 in each case together with the two further first phosphors 3b, c span an RGB color space. The colors which can be represented by a corresponding projection device are therefore restricted to the colors respectively lying within the triangle; with the second green phosphor 4, the triangle is enlarged toward the spectrum locus (the color saturation increases in this direction) and the color rendering possibilities are accordingly extended.

Six phosphors are compiled in table 1, and, because they afford advantages for different reasons in each case, they can be particularly advantageous when combined in pairs on a phosphor wheel. The phosphors are pumped at a pump light wavelength of approximately 450 nm.

The three garnet phosphors are distinguished by a high stability, that is to say that even at high intensities (more than 10 W/mm$^2$) and at high temperatures (more than 200° C.) no relevant chemical alteration of the phosphor occurs (within an observation period of 1000 hours). One disadvantage of the garnet phosphors, however, is the poor color locus, which can be disadvantageous when rendering image contents.

Therefore, a garnet phosphor provided as first phosphor 3a can be supplemented for example by a silicate phosphor provided as second phosphor 4, for instance by chlorosilicate or Lu, N-doped silicate. This is because these silicate phosphors are distinguished by a good color locus in the green; however, since they have only low stability, the lifetime of an illumination unit having exclusively such a silicate phosphor would be correspondingly limited. By virtue of the fact that now, according to the invention, garnet phosphor and silicate phosphor are combined and selected as required, good color rendering properties and a sufficient lifetime can equally be achieved.

By way of example, a silicate phosphor could also be combined with an $EU^{2+}$-doped SiON phosphor, because the silicate phosphor has only a low efficiency, that is to say that the luminous flux of the conversion light being obtained per pump power is rather low; accordingly, the energy requirement of such an illumination unit would be increased.

By contrast, the SiON phosphor has a very high efficiency, but only a mediocre color locus in the green. In the case of a phosphor wheel having both silicate phosphor and SiON phosphor, the silicate phosphor, disadvantageous with regard to the energy consumption, can be selected only when required, that is to say if a good color locus is necessary for rendering image contents, and otherwise the SiON phosphor can be selected. In an overall consideration, this can help to reduce the energy consumption in conjunction with nevertheless good color rendering possibilities.

Figure 3A:
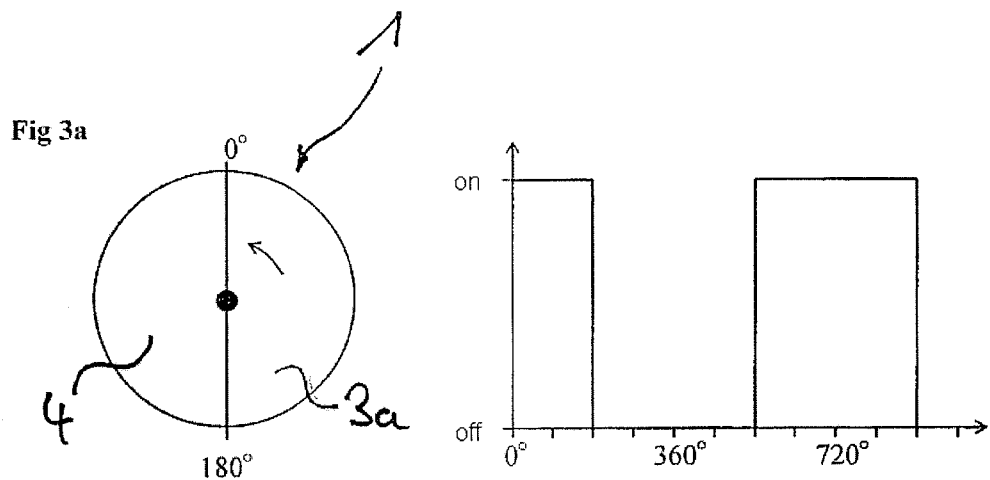
FIG. 3 shows a possible clocking between the rotation of a phosphor wheel according to the invention and the illumination of said phosphor wheel with pump light.

FIG. 3a shows a phosphor wheel 1 subdivided into two circle segments each taking up 180°; the first phosphor 3a is provided in one circle segment and the second phosphor 4 is provided in the other circle segment. With the rotation, the phosphor, as explained with reference to FIG. 1, is moved through a pump light cone (not shown here).

In this case, the graph depicted alongside the phosphor wheel 1 illustrates the temporal driving of the pump light source (the pump light could also be interrupted in the same way by means of a correspondingly clocked shutter). In this and the following cases, the pump light illumination is effected at the 0° position, that is to say that the pump light cone is incident on the phosphor wheel at the top (12 O'clock position).

The pump light illumination is clocked with the rotation of the phosphor wheel, such that, during the first rotation by 360°, pump light is incident on the phosphor wheel only during the first 180° partial rotation, that is to say that only the first phosphor 3a is illuminated. During the subsequent 360° rotation, illumination with pump light is effected only during the second 180° partial rotation, such that the second phosphor 4 is therefore operated. In this embodiment, therefore, either the first or the second phosphor 3a, 4 is illuminated during each rotation and the respective other phosphor is always illuminated during two successive revolutions.

Figure 3B:
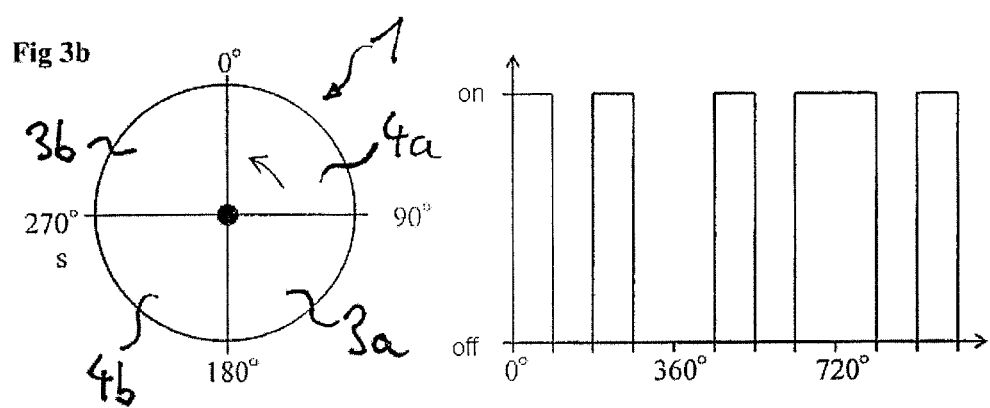

FIG. 3b shows a phosphor wheel 1 subdivided into four quadrants, in the quadrants of which are provided two first phosphors 3a, b supplemented in each case by a second phosphor 4a, b. The graph alongside the phosphor wheel shows a clocking of the pump light source, which changes from revolution to revolution between the illumination of the first and second phosphors 3a, b, 4a, b. Therefore, solely the second phosphors 4a, b are illuminated during the first revolution and exclusively the first phosphors 3a, b are illuminated during the second revolution (which as a result leads to illumination that changes with each revolution as in the case of FIG. 1a).

It goes without saying that in each case the first phosphor(s) 3a, b or the second phosphor(s) 4a, b can also be illuminated by means of a multiplicity of revolutions; in this respect, the clocking illustrated in FIG. 3 (between 0° and) 720° would then correspond to a change of the illumination, for instance a changeover from a phosphor having high stability to a phosphor having a good color locus (or vice versa).

Figure 4:
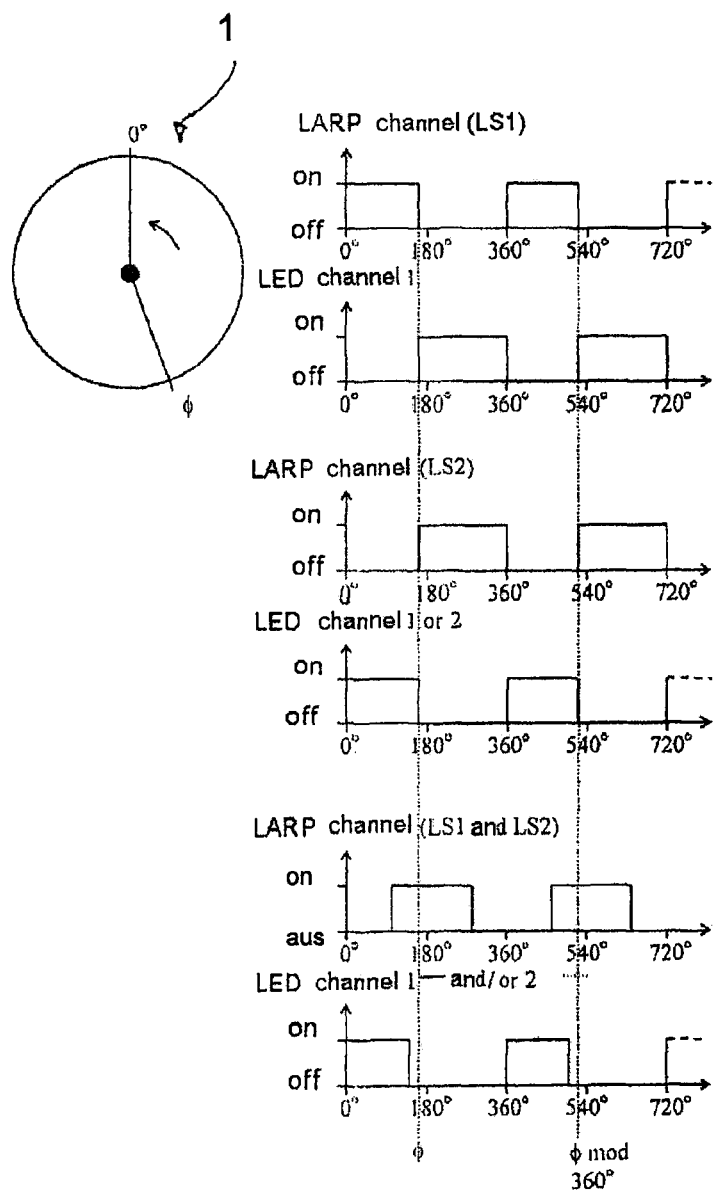
FIG. 4 shows a hybrid system having one phosphor wheel channel and one LED channel.

FIG. 4 shows a hybrid system, namely a phosphor wheel 1, the conversion light of which is supplemented by LED light. The LED light is admixed as a dedicated channel (LED channel) with the conversion light of the phosphor wheel (LARP channel; Laser Activated Remote Phosphor); in this case, the light mixing can be effected in a different optical element than the phosphor wheel, for instance a non-imaging optical unit, or else at the phosphor wheel if the latter has for example a cutout for coupling in the LED channel in transmission or a reflective surface for coupling-in in reflection.

Generally, in such a case, the different channels can have different colors, that is to say for example a red LED channel (if appropriate together with a further, blue LED channel) can be jointly provided with a green phosphor wheel channel.

The generality of the concept of the invention, in particular with regard to the clocking of the pump light illumination ("interrupted operation of the phosphor wheel"), can also be illustrated, however, in the case of a single-colored phosphor wheel in conjunction with an LED channel of the same hue. The phosphor wheel also need not necessarily actually be subdivided into two phosphor regions; the "subdivision" could also be effected virtually by means of corresponding illumination.

The graphs specifically illustrate how phosphor wheel and LED can complement one another, wherein the temporal proportion of the LED channel is higher in the first case (the two upper graphs). As a result, therefore, the phosphor wheel also only has to be illuminated for a correspondingly shorter time (compared with the second case, that is to say the middle two graphs), which can protect the phosphor and thus have a positive effect for example with regard to a lifetime of the illumination unit.

In this case, it may furthermore be advantageous if, during two successive revolutions, the same phosphor region is not illuminated (not shown in FIG. 4), that is to say that the previously illuminated phosphor region has time to cool for more than one revolution. An operating mode with a higher LED proportion may be of interest, for example, if a high luminous flux is not necessary.

By contrast, in the second case (the middle two graphs) the average phosphor wheel proportion is higher and the proportion of the LED light switched in during the pause times is lower; this operating mode can therefore be chosen, for example, if a high luminous flux or else (depending on the phosphor provided on the phosphor wheel) a good color locus is required.

The third case, that is to say the two lower graphs, are intended to illustrate the fact that phosphor wheel channel and LED channel can generally also be operated with a certain overlap. The latter is nevertheless preferably kept as small as possible, also for reasons of energy efficiency.

Figure 5:
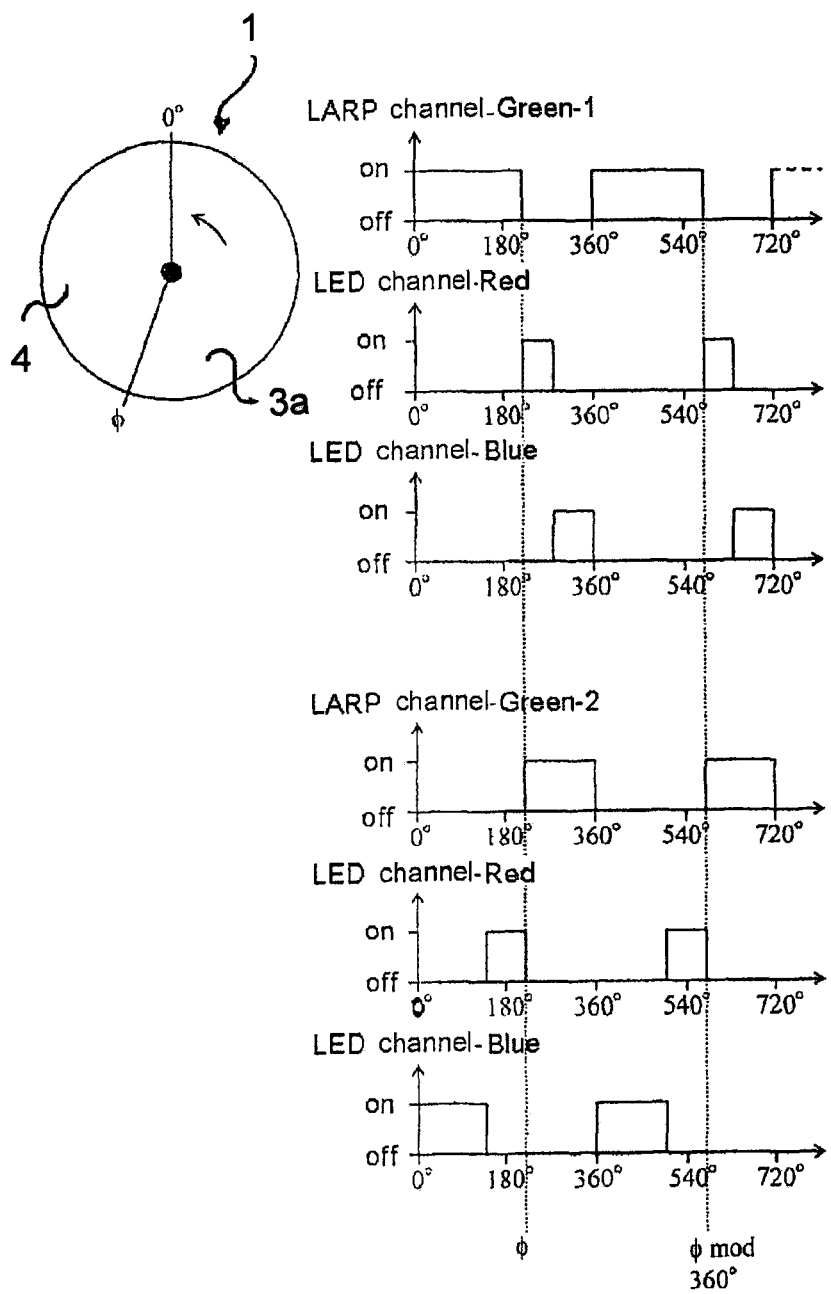
FIG. 5 shows a hybrid system having one phosphor wheel channel and two LED channels.

FIG. 5 shows a further exemplary embodiment with a phosphor wheel 1 according to the invention, on which the first phosphor 3a is provided in a first circle segment and the second phosphor 4 is provided in a second circle segment, complementary to the first. The graphs illustrate switching schemes of a projection device, specifically of a DLP projector (Digital Light Processing); the phosphor wheel is in turn pumped by a laser, and this phosphor wheel channel (green 1/green 2) is combined with two LED channels (red, blue) to form a multi-channel hybrid system (red, green 1/green 2, blue).

The upper three graphs illustrate a first operating mode, in which the rotation of the phosphor wheel 1 and the pump light source are clocked such that exclusively the first phosphor 3a is operated during each revolution. The first phosphor 3a is a garnet phosphor, and the first operating mode is accordingly not optimized toward color rendering, but rather is advantageous with regard to the overall lifetime of the illumination unit on account of the high stability of the garnet phosphor; moreover, the garnet phosphor has a high efficiency, that is to say that the luminous flux of the conversion light is correspondingly high (or the energy consumption is low) in the first operating mode. In conjunction also with the proportion that is beyond 180° relative to a 360° revolution (the first phosphor 3a takes up more than half of the phosphor wheel 1), the first operating mode is optimized toward a high luminous flux.

In the second operating mode (the lower three graphs), the second phosphor 4, a silicate phosphor, is operated; on account of the good color locus thereof, the second operating mode is optimized for color rendering.

In both operating modes, the pause times of the phosphor wheel channel are filled with the LED channels; the clocking of a micromirror array (DMD) is also adapted to the clocking illustrated in the graphs, the light of the channels being fed to said array by means of an optical system. During the individual intervals corresponding in each case to the switch-on time of a channel, the micromirror array selectively reflects light in different image points, which as a result leads to image rendering in the projection area.

The invention claimed is:

1. A phosphor wheel for converting pump light to conversion light, which is configured for rotation about a rotation axis comprising:
   a substrate;
   a first phosphor on said substrate for emitting conversion light of a first color and a second phosphor on said substrate for emitting conversion light of a second color, wherein the first phosphor is different than the second phosphor;
   wherein the first and second phosphors are arranged in a manner spatially separated from one another on the substrate, and
   wherein the light of the second phosphor has the same hue as the light of the first phosphor.

2. The phosphor wheel as claimed in claim 1, wherein the color of the second phosphor is at a distance of less than 0.2 in the x direction and of less than 0.2 in the y direction from the color of the first phosphor in terms of absolute value in the CIE standard chromaticity system.

3. The phosphor wheel as claimed in claim 1, wherein the color of the second phosphor has a higher color saturation than that of the first phosphor.

4. The phosphor wheel as claimed in claim 3, wherein the color of the first phosphor and that of the second phosphor lie on a common straight line with the white point in the CIE standard chromaticity system.

5. The phosphor wheel as claimed in claim 1, wherein, alongside the first phosphor, two additional first phosphors are provided and the colors of these three first phosphors span an RGB color space, wherein the color of the second phosphor together with the colors of the two additional first phosphors also spans an RGB color space and the two RGB color spaces differ by at least 5% in terms of their area in the CIE standard chromaticity system.

6. The phosphor wheel as claimed in claim 1, wherein the hues of the first and second phosphors lie in one of red and green.

7. The phosphor wheel as claimed in claim 1, wherein the first and second phosphors are arranged successively in a circumferential direction on the phosphor wheel.

8. The phosphor wheel as claimed in claim 1, wherein the first and second phosphors are arranged successively in a radial direction on the phosphor wheel.

9. An illumination unit comprising a phosphor wheel as claimed in claim 1 and a pump light source.

10. A method for operating a phosphor wheel as claimed in claim 1, wherein, relative to a complete rotation of the phosphor wheel, the phosphor wheel is illuminated with pump light only for a proportion of the time duration required for the rotation.

11. The method as claimed in claim 10, wherein, during two successive rotations of the phosphor wheel, the same phosphor is illuminated, but the regions of the phosphor which are illuminated per revolution differ at least partly.

12. The method as claimed in claim 10, wherein the first and second phosphors are arranged successively in a circumferential direction on the phosphor wheel, and wherein the illumination is effected in an interrupted manner such that only one of the first and second phosphors is illuminated during a complete revolution.

\* \* \* \* \*